July 24, 1962    R. BLANC    3,045,808
CHAIN CONVEYOR
Filed Feb. 25, 1957    2 Sheets-Sheet 1
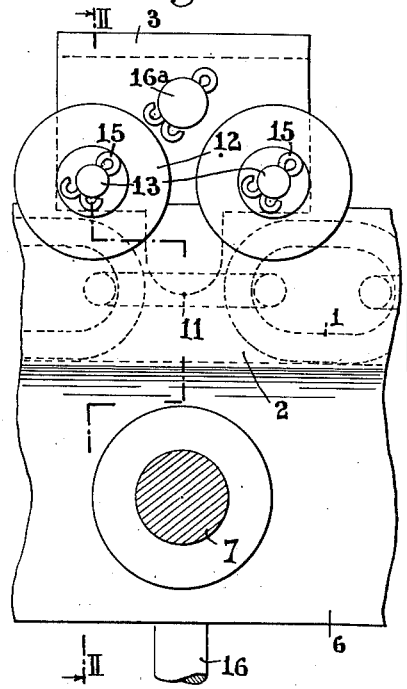
Fig.1
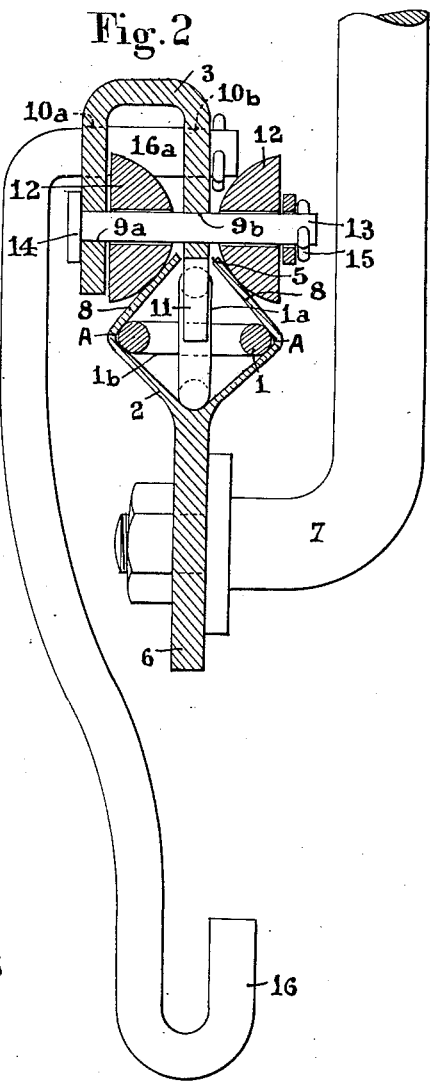
Fig.2
Fig.3
Inventor
Roger Blanc
by Michael S. Striker
agt.

July 24, 1962  R. BLANC  3,045,808
CHAIN CONVEYOR

Filed Feb. 25, 1957  2 Sheets-Sheet 2

Inventor:
Roger Blanc
by:
Michael S. Strike
Attorney 3,045,808
CHAIN CONVEYOR
Roger Blanc, 40 Rue des Prairies, Paris, France
Filed Feb. 25, 1957, Ser. No. 642,163
Claims priority, application France Feb. 27, 1956
7 Claims. (Cl. 198—177)

This invention relates to conveying machinery and has particular reference to an improved conveyor of the chain type.

Hitherto known chain conveyors, especially those of the overhead type, are objectionable mainly in that the load conveyed by the device is supported by the chain. Therefore, this chain must be particularly strong and this requirement is met at the expense of a substantial increase in the chain weight. Consequently, much power is lost on account of additional friction and also of the necessity of displacing the weight of the chain. Now it is the object of this invention to provide a device whereby this inconvenience is avoided. This device consists essentially of a chain, a sheath supporting and guiding said chain between its walls, and trolleys driven by said chain and rolling on the upper walls of said sheath, whereby only tractive efforts are applied to the chain.

The chain utilized in the device of this invention is a calibrated chain consisting of welded links forming a closed-crcuit or endless unit driven by a power or driving sprocket. This sheath is so designed as to have a cross-section in the form of a regular polygon characterized by at least two diagonals disposed at right angles to each other, preferably a square. The aforesaid sheath is so arranged that one of the diagonals of the polygon is constantly in a substantially vertical position. Inside this sheath the wall portions adjacent to the edges constitute bearing surface for the chain links so that the vertical and horizontal links thereof are constantly guided and supported in their corresponding planes. One of the edges of the sheath, normally the upper one, is open to permit the passage of a pin depending from the trolley and extending through one of the horizontal links, for driving the trolley from the chain.

Other features and advantages of this invention will appear as the following description proceeds with reference to the attached drawing forming part of this specification and illustrating diagrammatically by way of example a typical embodiment of the invention. In the drawing:

FIGURE 1 is a side elevational view of the device;

FIGURE 2 is a section of the device which is taken upon the broken line II—II of FIG. 1, and FIGURE 3 is a cross-sectional view showing one of the chain-driving toothed wheels or sprockets, the wheel being disposed in a return bend.

Figure 4:
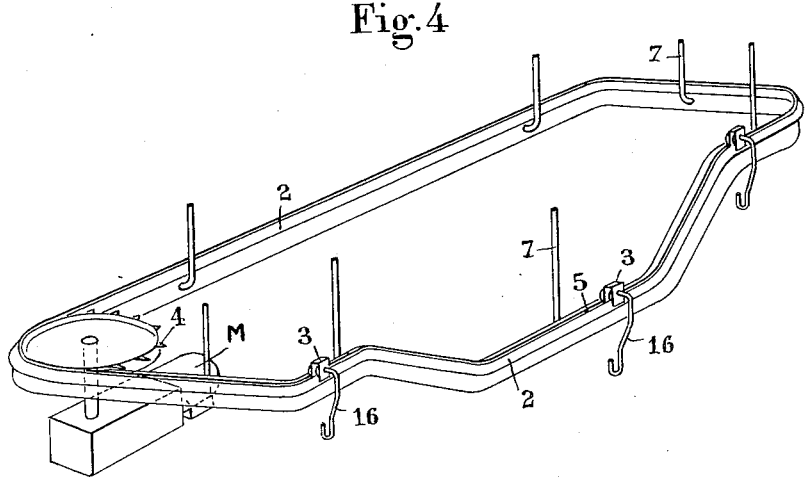
FIG. 4 is an isometric diagrammatic view illustrating a complete chain conveyor constructed in accordance with the teachings of this invention.
Figure 5:
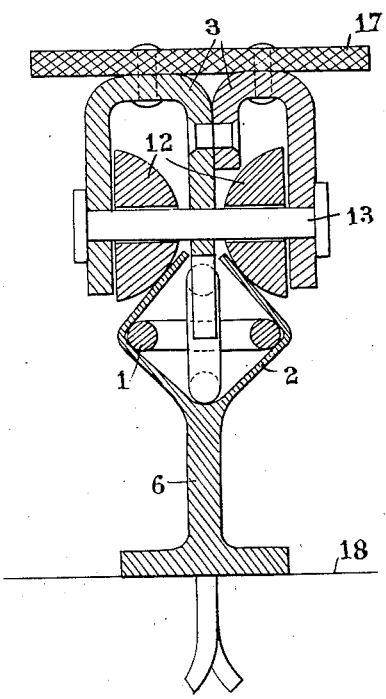
FIG. 5 is a cross-section illustrating a modified embodiment of the chain conveyor according to this invention.

Referring now to the drawings the device illustrated comprises essentially a chain 1, a sheath 2 surrounding or enclosing said chain and trolleys 3 driven by said chain.

The chain 1 is a calibrated chain, a chain having predetermined constant dimensions consisting of welded links, each link forming a right angle with the two adjacent links. The chain forms a closed-circuit or endless unit and is driven at any point of its length by a toothed wheel or power sprocket 4 disposed preferably in a substantially horizontal plane and driven from a motor M; the teeth of the sprocket 4 engage the apertures of the vertical links 1a, and the horizontal links 1b drives the trolleys 3. The toothed wheel may be so disposed as to drive the chain either along a straight or substantially straight portion thereof or at a return bend, as shown for example in FIG. 3.

According to an essential feature of this invention, the chain 1 is supported and guided by a sheath 2 so that only tractive efforts are applied to the chain, the vertical component created by the weight of the load conveyed by the device being applied to the sheath only.

This sheath 2 surrounds the chain along the entire circuit thereof. It is shaped to have preferably a square cross-section. However, shapes corresponding to other regular polygons may be used, provided that at least two diagonals of the polygon are disposed at right angles to each other. Inside the sheath 2 the wall portions adjacent to the edges A of the polygon constitute bearing surfaces for the chain links, the outer width of these links corresponding substantially to the length of the diagonals. Thus, both vertical and horizontal chain links are guided and supported in their respective planes. It may be emphasized that the bearing and guiding contact takes place only between cylinder generatrices as far as the links and the flat wall portions of the sheath are concerned. Thus, the contact surfaces are reduced to a minimum and power losses caused by friction are unimportant.

One of the sheath edges, normally the uppermost one, is open and forms a longitudinal slit 5 of a width slightly inferior to the diameter of the link-forming bars. Thus, the sheath will protect the chain on all sides while maintaining it in the proper position. At its lower edge the sheath is formed with an integral, substantially vertical flange 6 constituting on the one hand a stiffening member and on the other hand a practical means for fastening the sheath on brackets or supporting arms 7, according to the conventional practice.

The two upper faces 8 of the sheath are used as runways for a plurality of conveyor trolleys 3 through which the driving chain and the load are connected to each other.

The bodies of these trolleys 3 consist preferably of inverted, channel-sectioned plates; the wings or sides of the trolley body 3 are formed with aligned transverse holes 9a, 9b. One of these sides is co-planar with the vertical links of the chain and if desired also with the depending flange 6, and it is formed at an intermediate point of its lower edge with a depending pin or lug 11 extending through the slit 5 so as to engage one of the horizontal links of the chain, as shown; thus, the relevant trolley is carried along when the chain is driven by suitable power means.

The trolley 3 is adapted to roll on the outer faces 8 of the sheath through two pairs of rollers 12 which may be of semi-spherical configuration so as to adequately fit on the contour of the corresponding runways and accommodate any departure of the conveyor path from a horizontal and straight course. Thus, the runway may comprise sloping portions. The rollers 12 are mounted on the trolley body by means of a pair of transverse shafts 13 having a head 14 at one end and split or like pins 15 at the opposite end; these shafts 13 extend through apertures 9, 10 formed centrally of the rollers 12, as shown.

In its intermediate portion the trolley is formed with apertures 10a, 10b extending through each side of the inverted-channel member and in axial alignment with each other. These apertures are adapted to receive the upper arm 16a of a hook 16 constituting the load-supporting member proper.

From the foregoing it is apparent that the operation of the device constituting the subject-matter of this invention is characterized by a considerable flexibility. The linear speed of the chain and the number of trolleys may be strictly dependent on the rate of production, for example, the idle trolleys being easily removed so that the device will not comprise any dead weight. As the coupling between the trolleys and the chain is not permanent, the projecting pin 11 may be easily disconnected from the link and any accident or emergency occurring at any trolley will not jam or block the complete conveyor. On the other hand, as the whole of the load is supported by the sheath, the chain is subjected to tractive efforts only, so that its dimensions and therefore its weight may be reduced to an appreciable extent. Thus, substantial savings may be made both in the manufacture and installation of the conveyor, and also in the power requirements thereof. Besides, the dimensions of the component elements of the device are to a considerable extent independent of the weight of the load to be conveyed, as only the size and number of the supports or brackets carrying the runway being a direct function of this weight.

Moreover, this device is characterized by a silent operation and by the great facility with which possible failures in the chain or in a trolley may be repaired.

Of course, many modifications as to the shapes and details of the elements described and illustrated herein may be brought without departing from the spirit and scope of the present invention, as set forth in the appended claims. Thus, the device may also be constructed in the form of a conveyor belt 17 disposed just above floor level 18 on which the vertical flange 6 of sheath 2 is secured, the conveyor belt being carried by the body 3 of the different trolleys of the chain conveyor.

What I claim is:

1. A chain conveyor comprising an endless calibrated chain of constant dimensions, consisting of two series of successive interengaged links of round wire which lie alternately in planes at right angles to each other; a fixed endless tubular sheath in which said chain is movable, said sheath forming an endless path along which said chain moves, said path being substantially horizontal, said sheath having in cross section a regular polygonal configuration with two inclined upper faces and with an even number of sides and corners and two diametral corners of said corners being located in a horizontal plane, and a third corner being located in a vertical plane of symmetry and below said first mentioned two corners to act respectively as guide means for one of said series of links in order to maintain them in horizontal position, and for the other series of chain links in order to maintain the same in vertical position, said sheath having a slot extending diametrically opposite said third corner in said plane of symmetry and along the entire length of said sheath; means for driving said chain in said sheath; at least one load supporting trolley adapted to roll straddle-wise on said two upper inclined faces of said sheath on either side of said slot; a depending lug rigid with said trolley and extending through said slot and engaging any one of said transverse links so as to be carried along by said chain without being attached thereto, whereby said trolley may be either drivingly connected to said chain by placing said trolley on said sheath, or disconnected therefrom by lifting said trolley.

2. A chain conveyor as set forth in claim 1, wherein said trolley driving lug is so shaped that in case of accidental stoppage of said trolley at any point along said path during the operation of the conveyor, said lug will be thrust out by said chain links, whereby said chain may continue to move.

3. A chain conveyor as set forth in claim 1, an endless belt secured flat on the top of suitably spaced trollies for supporting loads, said sheath being rigid with and including a support having substantially the form of an inverted T which is adapted to be secured to the ground.

4. A conveyor according to claim 1, wherein said trolley is provided with four wheels of semi-spherical configuration so as to roll on said inclined upper faces of said sheath which are adjacent to the slot thereof.

5. Conveyor according to claim 1, for an overhead installation, wherein said sheath includes and is supported by brackets and said trolley is provided with hook members for suspending therefrom the load to be conveyed.

6. A conveyor arrangement comprising an endless sheath arranged in a horizontal plane, and having along the length thereof a slot in the top thereof, said sheath having a polygonal cross section with two corners arranged in a horizontal plane, and a third corner located in a vertical plane of symmetry of said sheath underneath said slot; an endless chain slidably guided in said endless sheath and including two series of alternately arranged interengaged chain links, one of said sets of chain links slidably engaging said first-mentioned two corners, and the other of said sets of chain links being located in said vertical plane of symmetry and slidably engaging said third corner, each of said chain links being substantially annular; drive means for moving said endless chain relative to said endless sheath; a trolley located on the top portion of said endless sheath for movement along said endless sheath, said trolley having a depending lug downwardly projecting through said slot and into one of said links of said one set of links, whereby said trolley can be removed from said sheath by raising said trolley and said lug, and is coupled to said chain for movement therewith by inserting said lug through said slot.

7. A conveyor arrangement comprising an endless sheath arranged in horizontal plane, and having along the length thereof a slot in the top thereof, said sheath having a polygonal cross section with two corners arranged in a horizontal plane, and a third corner located in a vertical plane of symmetry of said sheath underneath said slot; an endless chain slidably guided in said endless sheath and including two series of alternately arranged interengaged chain links, one of said sets of chain links slidably engaging said first-mentioned two corners, and the other of said sets of chain links being located in said vertical plane of symmetry and slidably engaging said third corner, each of said chain links being substantially annular; drive means for moving said endless chain relative to said endless sheath; a trolley located on the top portion of said endless sheath for movement along said endless sheath, said trolley having a depending lug downwardly projecting through said slot and into one of said links of said one set of links, whereby said trolley can be removed from said sheath by raising said trolley and said lug, and is coupled to said chain for movement therewith by inserting said lug through said slot, said lug sliding on an adjacent link of the other set of said sets when movement of said trolley is obstructed whereby said lug and trolley are raised until said lug passes out of said one link whereby the coupling between said trolley and said chain is disconnected.

References Cited in the file of this patent

UNITED STATES PATENTS

| | | |
|---|---|---|
| 1,149,919 | Keinanen | Aug. 10, 1915 |
| 1,730,519 | McKee | Oct. 8, 1929 |
| 2,619,916 | Rainier | Dec. 2, 1952 |
| 2,768,733 | Wilson | Oct. 30, 1956 |
| 2,844,243 | Christiansen | July 22, 1958 |

FOREIGN PATENTS

| | | |
|---|---|---|
| 530,550 | Belgium | Aug. 14, 1954 |